(12) United States Patent  
Kim

(10) Patent No.: US 7,542,122 B2  
(45) Date of Patent: Jun. 2, 2009

(54) IPS MODE LIQUID CRYSTAL DISPLAY DEVICE AND MANUFACTURING METHOD THEREOF

(75) Inventor: Do Sung Kim, Gumi-si (KR)

(73) Assignee: LG Display Co., Ltd., Seoul (KR)

( * ) Notice: Subject to any disclaimer, the term of this patent is extended or adjusted under 35 U.S.C. 154(b) by 604 days.

(21) Appl. No.: 11/117,379

(22) Filed: Apr. 29, 2005

(65) Prior Publication Data

US 2006/0146247 A1 Jul. 6, 2006

(30) Foreign Application Priority Data

Dec. 31, 2004 (KR) .................. 10-2004-0118485

(51) Int. Cl.
    G02F 1/1345 (2006.01)
    G02F 1/1343 (2006.01)
(52) U.S. Cl. ..................... 349/152; 349/141
(58) Field of Classification Search ............. 349/141, 349/143, 149–152
    See application file for complete search history.

(56) References Cited

U.S. PATENT DOCUMENTS 6,801,287 B2 * 10/2004 Kurahashi et al. ........... 349/141  
7,248,323 B2 * 7/2007 Ahn et al. .................... 349/141

* cited by examiner

*Primary Examiner*—Dung T. Nguyen  
(74) *Attorney, Agent, or Firm*—McKenna Long & Aldridge LLP

(57) ABSTRACT

An IPS mode LCD for improving image quality and a manufacturing method thereof are provided. When a common-voltage supply line and common lines are formed on different layers using different materials and connected via a contact hole, a contact resistance is increased due to an increase of a contact area and thus common signals are delayed. To solve the common signal delay, the common-voltage supply line and the common lines are integrally formed using the same material so that common signals are applied to the common lines without delay. Thus, preventing image quality deterioration due to the delay of the common signals.

25 Claims, 12 Drawing Sheets

IPS MODE LIQUID CRYSTAL DISPLAY DEVICE AND MANUFACTURING METHOD THEREOF

This application claims the benefit of Korean Patent Application No. 2004-118485, filed on Dec. 31, 2004, which is hereby incorporated by reference for all purposes as if fully set forth herein.

BACKGROUND OF THE INVENTION

1. Field of the Invention

The present invention relates to a liquid crystal display device (LCD), and more particularly, to an in-plane-switching (IPS) mode LCD and a manufacturing method thereof.

2. Description of the Related Art

Cathode ray tubes (CRTs) have been most widely used for display devices to display image information on a screen. However, the CRTs are large and heavy in their volume and weight for their display region and so there has been much inconvenience in an aspect of use.

With the recent development of the electronic industry, display devices whose usage has been limited to a television (TV) braun tube are now widely used for personal computers (PCs), notebook computers, automobile instrument panels, and electronic display boards. With development of information and telecommunication technology, next-generation display devices that are capable of processing and realizing large-capacity image information is emerging as an important issue.

The next-generation display devices should be lightweight, slim in profile, have high brightness, a large screen, low power consumption, and a low price. As one of the next-generation display devices, LCDs are drawing attention.

The display resolution in LCDs is excellent compared to other display devices and a response time is as fast as CRTs when displaying moving images.

The types of LCDs primarily being used are twisted nematic (TN) mode LCDs. In TN mode LCDs, electrodes are installed on two substrates, respectively, a director of liquid crystal molecules is arranged so as to be twisted 90 degrees, and then a voltage is applied to the respective electrodes so that the director of the liquid crystal molecules is driven.

However, the TN mode LCD has a crucial disadvantage of a narrow viewing angle.

To solve the narrow viewing angle problem, studies on LCDs adopting a variety of new modes are actively in progress. Examples of such modes includes an IPS mode and an optically compensated birefringence (OCB) mode.

The IPS mode LCDs have two electrodes formed on the same substrate so as to drive the liquid crystal molecules with the molecules maintained parallel with respect to the substrate, applies a voltage between the two electrodes to generate a horizontal, transverse electric field with respect to the substrate. That is, a longitudinal axis of the liquid crystal molecules is not allowed to stand up with respect to the substrate.

Therefore, the IPS mode LCDs have a small variation in a birefringence of the liquid crystal molecules with respect to a vision direction, and thus have far better viewing angle characteristics compared to the TN mode LCDs of a related art.

A structure of the IPS mode LCDs of the related art will be described below with reference to the accompanying drawings.

FIG. 1 is a schematic, plan view of the IPS mode LCDs of the related art and FIG. 2 is a cross-sectional view taken along line A-A' of FIG. 1.

As illustrated in FIGS. 1 and 2, IPS mode LCDs include: a plurality of gate lines 112 horizontally arranged in parallel with each other, and spaced a predetermined interval on a substrate 110; a plurality of common lines 116 horizontally arranged in parallel with each other, closely to the gate lines 112; and a plurality of data lines 124 crossing with the gate line 112 and common line 116 and vertically arranged and spaced a predetermined interval, for defining a pixel region P together with the gate lines 112.

A thin film transistor (TFT) T that includes a gate electrode 114, semiconductor layers (not shown), a source electrode 126, and a drain electrode 128 are formed at crossings of the gate lines 112 and the data lines 124. The source electrode 126 is connected with the data line 124 and the gate electrode 114 is connected with the gate line 112.

A gate pad 152 is formed at one end of the gate lines 112. On the gate pad 152, a gate pad upper electrode 153 is connected with the gate pad 152 through a contact hole 155 that passes through a gate insulation layer 118 and a passivation layer 134.

A pixel electrode 130 connected with the drain electrode 128 and a common electrode 117 arranged in parallel with the pixel electrode 130 and connected with the common lines 116 are formed on an upper part of the pixel region P.

The pixel electrode 130 includes: a plurality of vertical parts 130b extended from the drain electrode 128, formed in parallel with the data lines 124, and spaced a predetermined interval each other; and a horizontal part 130a for incorporating the vertical parts 130b into one part at an upper portion of the common lines 116.

The common electrode 117 includes: a plurality of vertical parts 117b vertically extended from the common lines 116 and alternately formed in parallel with the vertical parts 130b of the pixel electrode 130; and a horizontal part 117a for incorporating the vertical parts 117b into one part.

The horizontal part 130a of the pixel electrode 130 is formed with the gate insulation layer 118 interposed on part of the common lines 116 and forms a storage capacitor C together with the common lines 116.

The common lines 116 and the common electrode 117 are made of the same material as the gate lines 112 and formed on the same layer as the gate lines 112.

The gate lines 112 and the data lines 124 have, at their one end, an input pad for applying scanning signals and data signals provided from an external printed circuit board (PCB) to the gate lines 112 and the data lines 124.

The common lines 116 arranged in parallel with the gate lines 112 are connected with a common-voltage supply line 159 provided to an outer block of a panel.

Since the common-voltage supply line 159 is formed in a direction that crosses the gate lines 112 so as to incorporate the common lines 116 into one line, the common-voltage supply line 159 is made of the same material as the data lines 124 and formed on the same layer as the data lines 124 so as to avoid connection of the gate lines 112 and the common-voltage supply line 159 on the same plane.

Therefore, since the common-voltage supply line 159 made of the same material as the data lines 124 has the gate insulation layer 118 interposed on a space between the common-voltage supply line 159 and the common lines 116, a contact hole 165b is formed in the common lines 116 and another contact hole 165a is formed in the common-voltage supply line 159 so that the common lines 116 are connected with the common-voltage supply line 159 by a jumping electrode 166.

With this configuration, in case the common lines 116 and the common-voltage supply line 159 are formed using different material and connected using the jumping electrode 166 as described above, common signals pass through PCB-> TCP (tape carrier package)-> a common-voltage supply line (data line material)->a jumping electrode and is finally applied to the common lines (gate line material).

In that case, a resistance of the data line material is larger than that of the gate line material. Further, in the case that a contact area for the common lines is made large so as to secure a contact area for the jumping electrode 166, a contact resistance is increased. Thus, a contact resistance for an external TCP is increased and common signals applied from the outside are delayed. Signal delay due to the large contact resistance between the common lines and the jumping electrode causes image quality deterioration.

SUMMARY OF THE INVENTION

Accordingly, the present invention is directed to an IPS mode LCD and a manufacturing method thereof that substantially obviates one or more problems due to limitations and disadvantages of the related art.

An advantage of the present invention is to provide an IPS mode LCD and a manufacturing method thereof capable of improving image quality by forming common lines and common-voltage supply line using the same material to prevent delay of common signals.

Additional advantages, and features of the invention will be set forth in part in the description which follows and in part will become apparent to those having ordinary skill in the art upon examination of the following or may be learned from practice of the invention. This and other advantages of the invention may be realized and attained by the structure particularly pointed out in the written description and claims hereof as well as the appended drawings.

To achieve these and other advantages and in accordance with the purpose of the invention, as embodied and broadly described herein, there is provided an IPS mode LCD, which includes: a plurality of gate lines formed in a first direction on a substrate; a plurality of common lines formed substantially parallel to the gate lines in the first direction; a common-voltage supply line integrally formed with the common lines; a plurality of data lines formed in a second direction that perpendicularly crosses the first direction of the gate lines; a TFT formed at a crossing of the gate lines and the data lines; a plurality of common electrodes extended from the common lines; and a plurality of pixel electrodes arranged in an alternating pattern with the common lines.

In another aspect of the present invention, there is provided a method for manufacturing an IPS mode LCD, which includes: forming a plurality of gate lines having a first direction, a plurality of common lines substantially parallel to the gate lines, a plurality of common electrodes extending from the common lines, and a common-voltage supply line having the first direction and integrally connected at one end of the common lines; forming a plurality of data lines in a second direction so as to cross the gate lines; forming source and drain electrodes, wherein the source electrodes are extended from the data lines; and forming a pixel electrode connected with the drain electrode.

In another aspect of the present invention, there is provided an IPS mode LCD that includes a first metal layer including a plurality of gate lines, a plurality of common lines, a plurality of common electrodes, and a common-voltage supply line integrally formed with the common lines; a second metal layer including a plurality of data lines, and source and drain electrodes; and a third metal layer including a plurality of pixel electrodes and a jumping electrode.

In another aspect of the present invention, there is provided a method of manufacturing an in-plane switching (IPS) mode liquid crystal display device (LCD) that includes, forming a first metal layer including a plurality of gate lines, a plurality of common lines, a plurality of common electrodes, and a common-voltage supply line integrally formed with the common lines; forming a second metal layer including a plurality of data lines, and source and drain electrodes; and forming a third metal layer including a plurality of pixel electrodes and a jumping electrode.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE ILLUSTRATED EMBODIMENTS

Reference will now be made in detail to embodiments of the present invention, examples of which are illustrated in the accompanying drawings.

Figure 1:
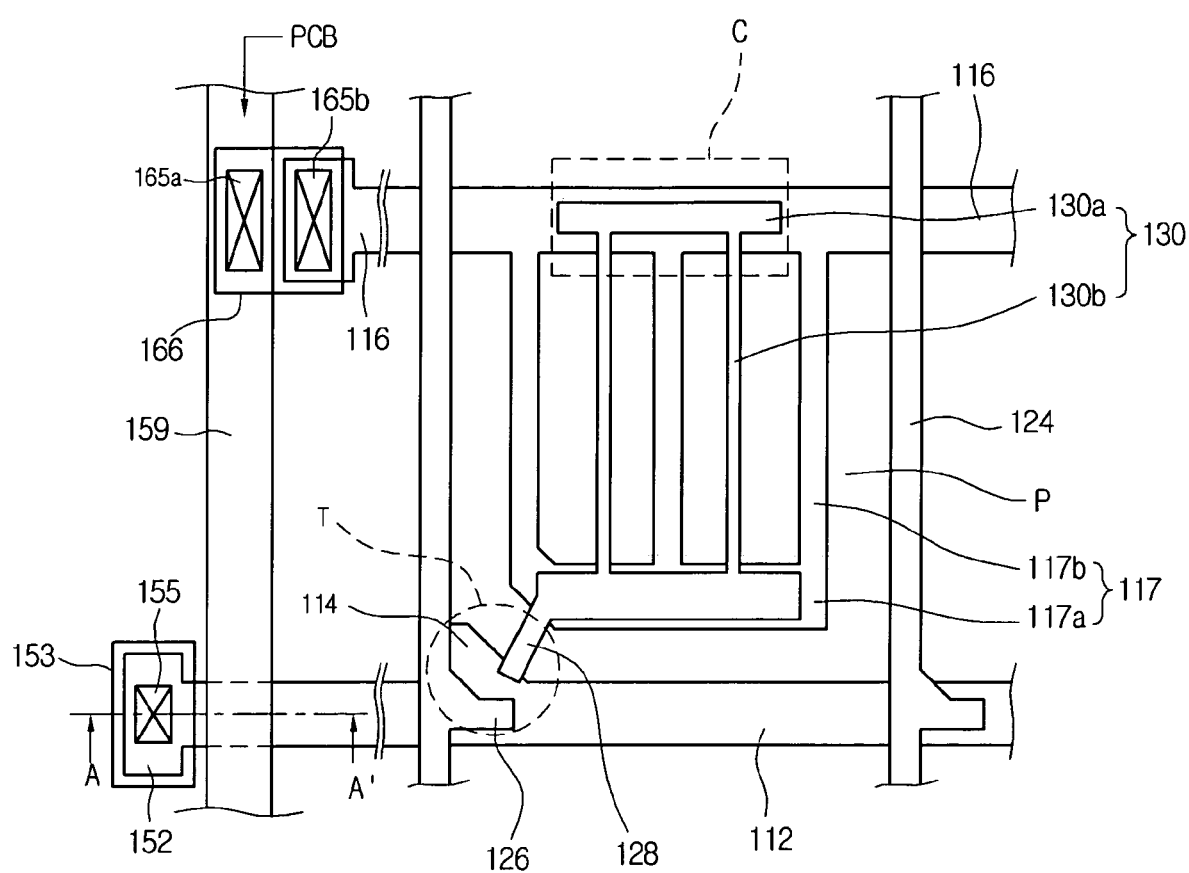
FIG. 1 is a schematic, plan view of IPS mode LCDs of a related art.
Figure 2:
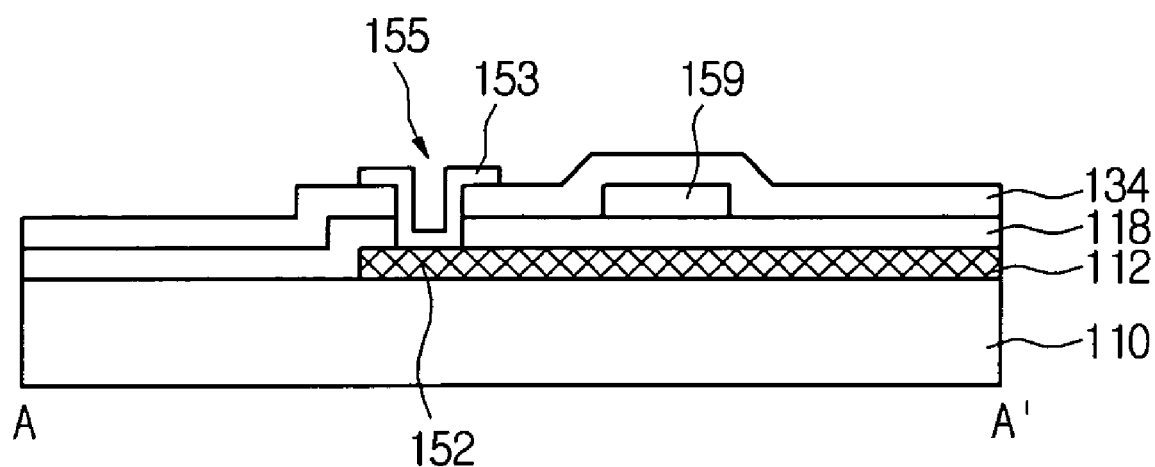
FIG. 2 is a cross-sectional view taken along line A-A' of FIG. 1.
Figure 3:
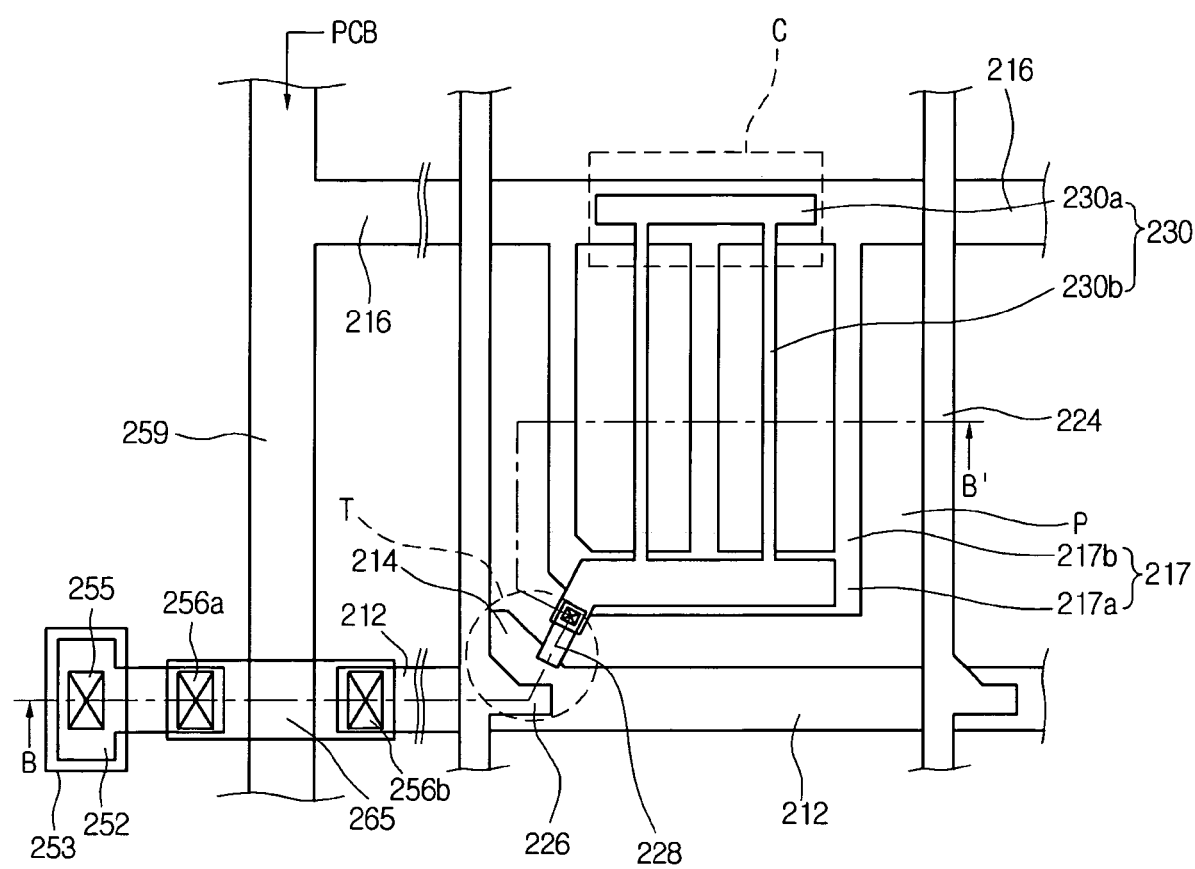
FIG. 3 is a plan view of IPS mode LCDs according to the present invention.
Figure 4:
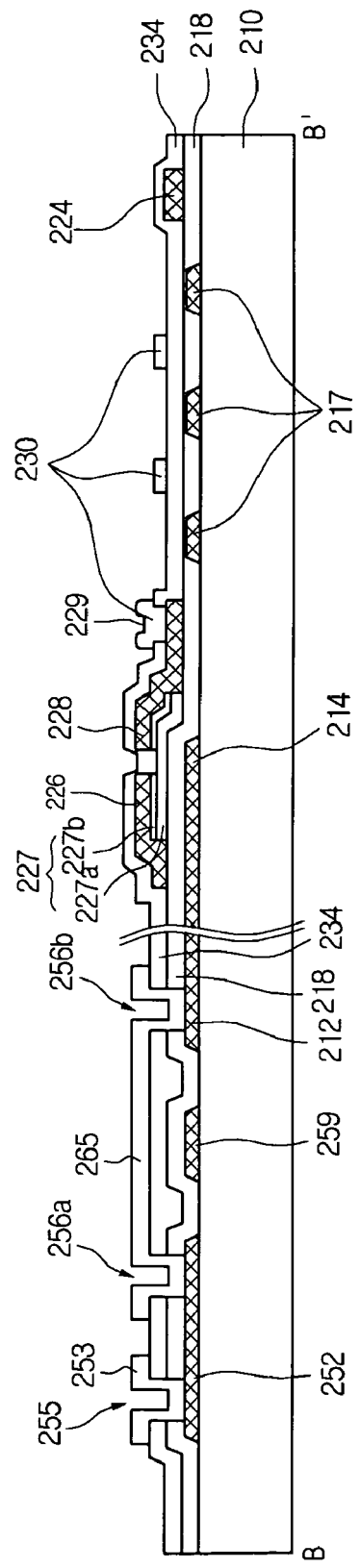
FIG. 4 is a cross-sectional view taken along line B-B' of FIG. 3.

FIG. 3 is a plan view of IPS mode LCDs according to the present invention and FIG. 4 is a cross-sectional view taken along line B-B' of FIG. 3.

In FIGS. 3 and 4, the IPS mode LCDs includes: a plurality of gate lines 212 horizontally arranged substantially parallel with each other and spaced a predetermined interval on a substrate 210; a plurality of common lines 216 horizontally arranged substantially parallel with each other, and closely to the gate lines 212; and a plurality of data lines 224 crossing with the gate line 212 and common line 216, vertically arranged substantially parallel with each other and spaced a predetermined interval, to define a pixel region P together with the gate lines 212.

A plurality of common electrodes 217 extend to the pixel region P and are connected with the common lines 216. The plurality of common electrodes may extend in a direction substantially perpendicular to a direction of the common lines 216.

A gate pad 252 is formed at one end of the gate lines 212 and a data pad is formed at one end of the data lines 224.

The common lines 216 are formed in a horizontal direction substantially parallel with the gate lines 212. The common lines 216 are integrally formed with a common-voltage supply line 259 provided at an outer block of a panel.

The common electrode 217 includes: a plurality of vertical parts 217b vertically extended from the common lines 216 and formed substantially parallel and in an alternating pattern with vertical parts 230b of the pixel electrode 230; and a horizontal part 217a for incorporating the vertical parts 217b into one part.

The common-voltage supply line 259 is formed in a direction substantially perpendicular to the common lines 216 to connect the common lines 216 of the respective pixel regions.

In the meantime, since the common-voltage supply line 259 and the gate lines 212 are formed in a crossing direction, the gate lines 212 are spaced a predetermined interval from the common-voltage supply line 259 for prevention of connection.

That is, the common-voltage supply line 259 is extended from the common lines 216 and formed in a direction substantially perpendicular to the common lines 216. The gate lines 212 are cut at a portion crossing with the common-voltage supply line 259 and connected with the gate pad 252 through a jumping electrode 265.

A thin film transistor (TFT) T that includes a gate electrode 214, semiconductor layers 227a and 227b, a source electrode 226, and a drain electrode 228 is formed at a crossing between the gate lines 212 and the data lines 224.

A gate insulation layer 218 is formed on the gate electrode 214 protruded from the gate lines 212 and semiconductor layers 227 form an active layer 227a and an ohmic contact layer 227b on the gate insulation layer 218.

Data lines 224 are formed on the gate insulation layer 218 so as to form a matrix structure together with the gate lines 212.

Further, a source electrode 226 extended from the data lines 224 and a drain electrode 228 spaced a predetermined interval from the source electrode 226 are formed on the gate insulation layer 218.

A passivation layer 234 is formed on the source and the drain electrodes 226 and 228. A pixel electrode 230 connected through the drain electrode 228 and a pixel contact hole 229 is formed on the pixel region P with the passivation layer 234 interposed.

The pixel electrode 230 includes: a plurality of vertical parts 230b extended from the drain electrode 228, formed substantially parallel with the data lines 224, and spaced a predetermined interval each other; and a horizontal part 230a formed on an upper portion of the common lines 216, for incorporating the vertical parts 230b into one part.

The horizontal part 230a of the pixel electrode 230 and the common lines 216 form a storage capacitor C.

The data lines 224, the pixel electrode 230, and the common electrode 217 can be of a zigzag type having more than at least one bent portion.

The common lines 216 and the common electrode 217 are made of the same material and formed on the same layer as the gate lines 212. The material may include pure aluminum, pure copper, an aluminum alloy or a copper alloy.

Therefore, since the common-voltage supply line 259 and the common lines 216 are made of the same material as the gate lines 212, common signals of the common-voltage supply line 259 are not hindered by any resistance and a signal delay is not generated. Accordingly, the common signals are supplied to the panel at a desired point of time and image quality of the panel can be improved.

The gate pad 252 contacts a gate pad upper electrode 253 made of a transparent conductive electrode through a gate pad contact hole 255 that passes through the gate insulation layer 218 and the passivation layer 234. The gate pad 252 is connected with the gate lines 212 through the jumping electrode 265 made of a transparent conductive electrode and the gate line contact holes 256a and 256b.

The jumping electrode 265 crosses the common-voltage supply line 259, and connects the gate line 212 and the gate pad 252.

A manufacturing process of the IPS mode LCDs having the above-described structure will be described in more detail with reference to FIGS. 5 to 7.

Figure 5A:
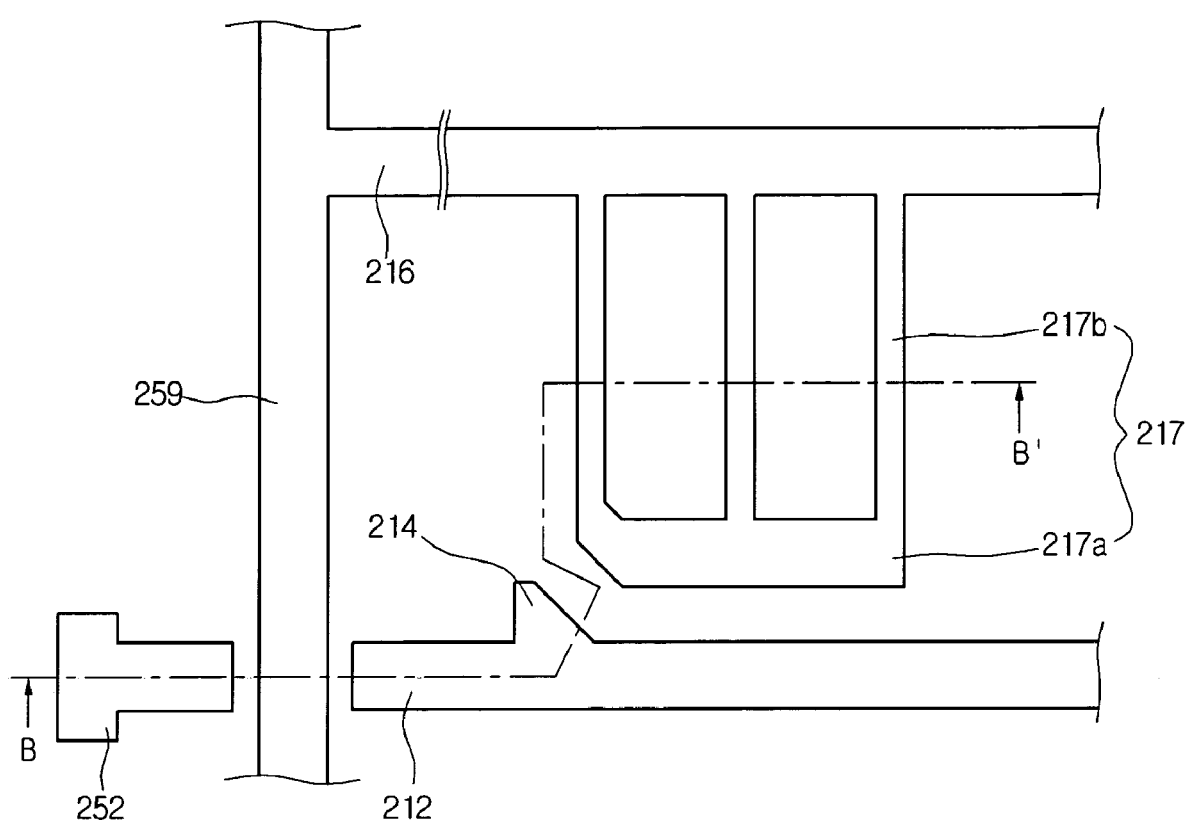
FIGS. 5A and 5B are a plan view and a cross-sectional view, respectively, illustrating a manufacturing process of IPS mode LCDs according to the present invention.
Figure 5B:
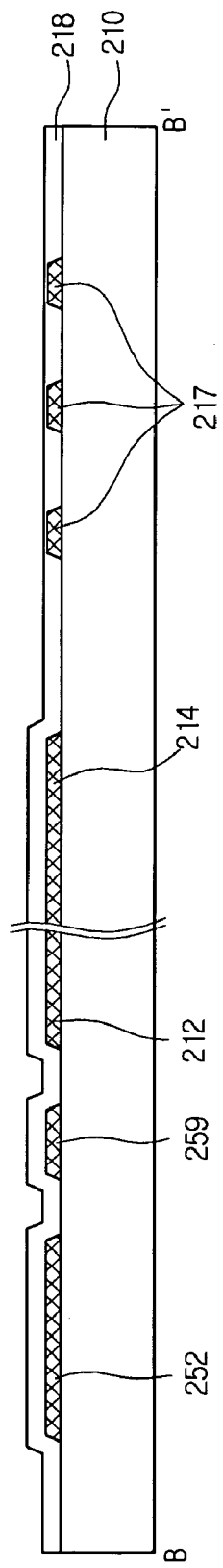

FIGS. 5A and 5B are a plan view and a cross-sectional view, respectively, illustrating a manufacturing process of IPS mode LCDs according to the present invention.

In FIGS. 5A and 5B, after metal is deposited on the substrate 210, patterning is performed so that a plurality of gate lines 212, a gate electrode 214 extending from the gate lines 212, and a plurality of common lines 216 arranged in the same direction as the gate lines 212 close to the gate lines 212 are formed.

The gate lines 212 have a gate pad 252 located at one end.

The common lines 216 are formed in a first direction substantially parallel to the gate lines 212, and one end of the common lines 216 is integrally formed with the common-voltage supply line 259.

The common electrode 217 extends from the common lines 216. The common electrode 217 includes: a plurality of vertical parts 217b vertically extended from the common lines 216; and a horizontal part 217a incorporating the vertical parts 217b into one part.

The common-voltage supply line 259 is integrally formed in a direction substantially perpendicular to the common lines 216.

Since the common-voltage supply line 259 and the gate lines 212 are formed in a crossing direction, the gate lines 212 are spaced a predetermined interval from the common-voltage supply line 259 so that there is no connection between the gate lines and common-voltage supply line.

That is, the common-voltage supply line 259 is extended from the common lines 216 and formed in a direction substantially perpendicular to the common lines 216. The gate lines 212 are cut at a portion intersecting with the common-voltage supply line 259 and connected with the gate pad 252 using a jumping electrode 265.

Next, a gate insulation layer 218 is formed on a front surface that includes the gate electrode 214.

Figure 6A:
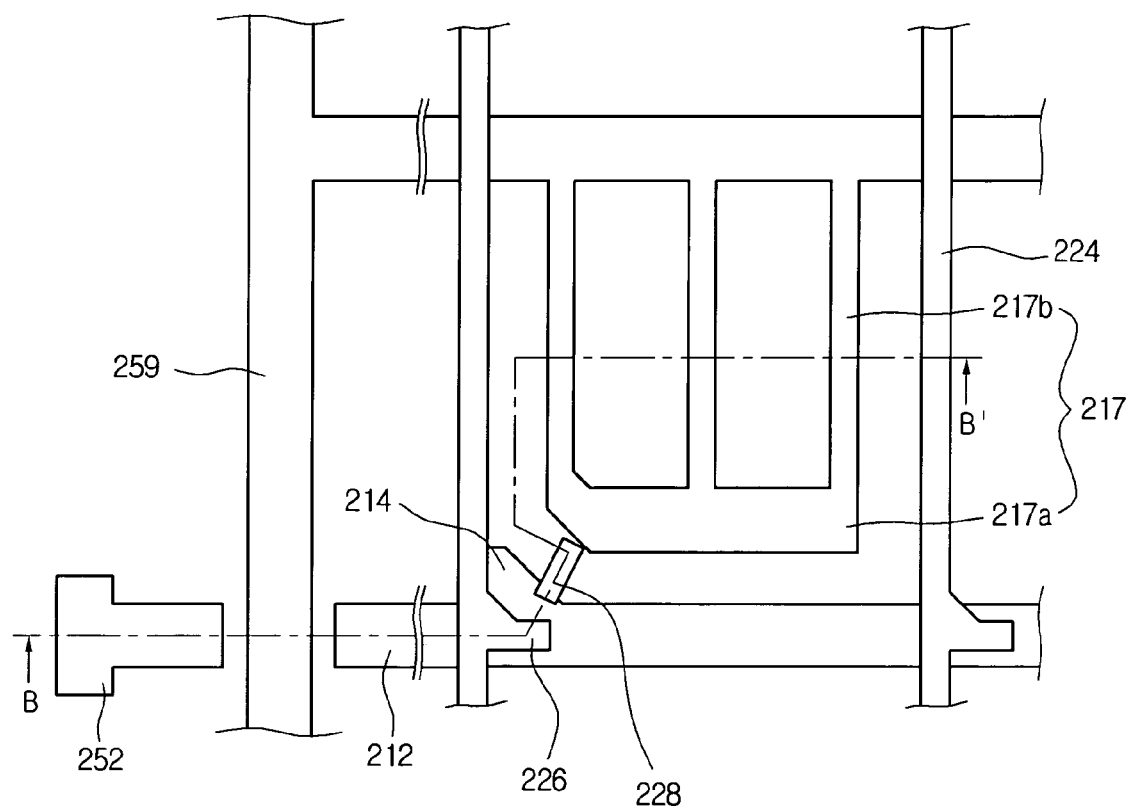
FIGS. 6A to 6B are a plan view and a cross-sectional view, respectively, illustrating a manufacturing process of IPS mode LCDs according to the present invention, subsequent to FIG. 5.
Figure 6B:
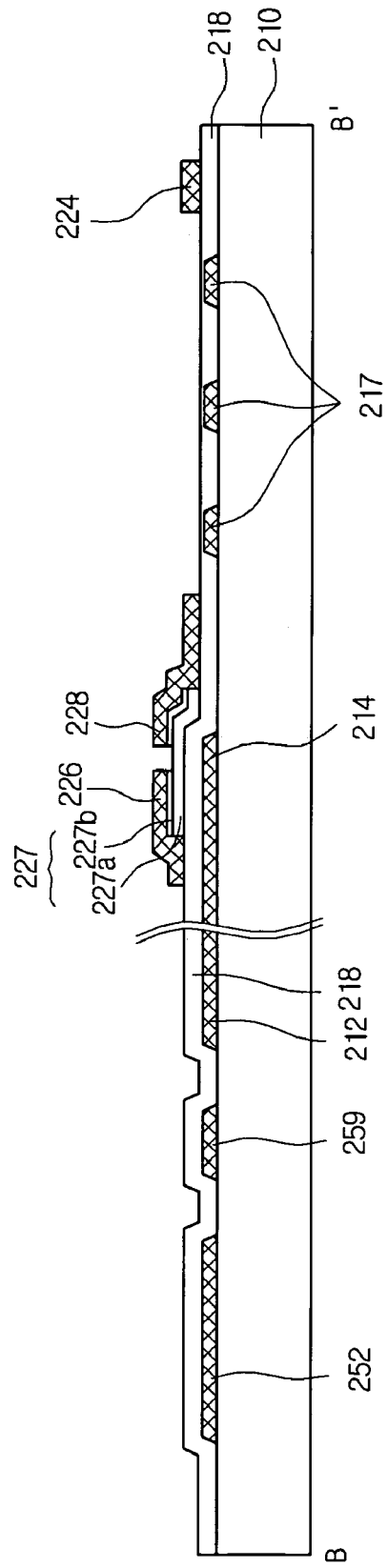

FIGS. 6A to 6B are a plan view and a cross-sectional view, respectively, illustrating a manufacturing process of IPS mode LCDs according to the present invention, subsequent to FIGS. 5A and 5B.

In FIGS. 6A and 6B, a semiconductor layer 227 including an active layer 227a and an ohmic contact layer 227b is formed at a position of the gate electrode 214 on the gate insulation layer 218.

Data lines 224 are formed on the gate insulation layer 218 so as to form a matrix structure along with the gate lines 212. The data lines 224 are formed substantially perpendicular to the gate lines 212. Accordingly, the pixel region P is formed by the gate lines 212 and the data lines 224.

When the data lines 224 are formed, source and drain electrodes 226 and 228 are simultaneously formed. The source electrode 226 is connected to the data lines 224 and the drain electrode 228 is spaced a predetermined interval from the source electrode 226. Accordingly, a TFT T including the gate electrode 214, the semiconductor layers 227, the source and the drain electrodes 226 and 228 are formed.

Figure 7A:
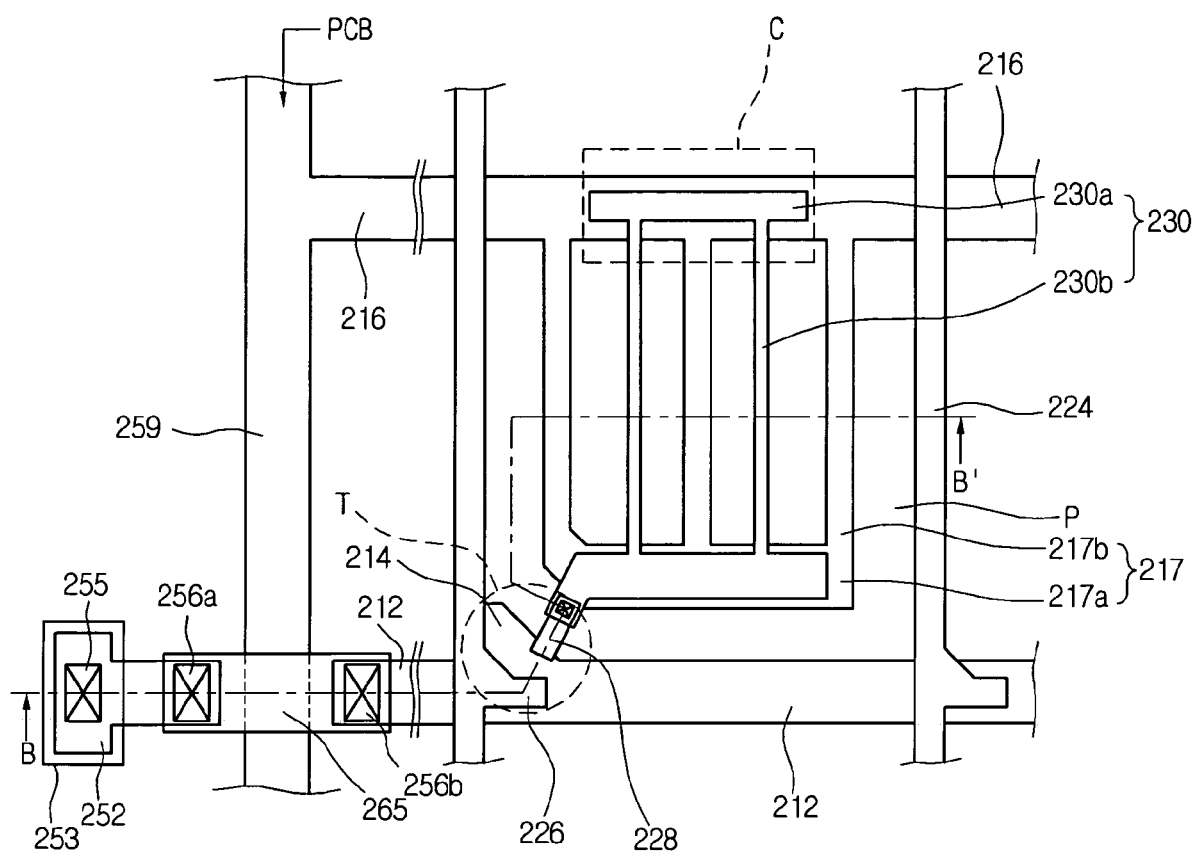
FIGS. 7A and 7B are a plan view and a cross-sectional view, respectively, illustrating a manufacturing process of IPS mode LCDs according to the present invention, subsequent to FIG. 6.
Figure 7B:
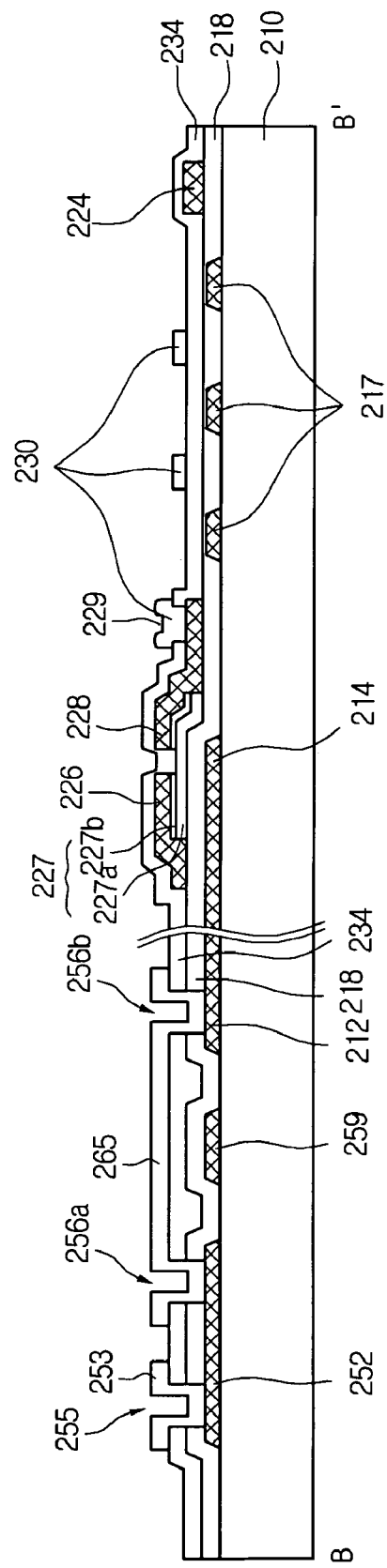

FIGS. 7A and 7B are a plan view and a cross-sectional view, respectively, illustrating a manufacturing process of IPS mode LCDs according to the present invention, subsequent to FIGS. 6A and 6B.

In FIGS. 7A and 7B, a passivation layer 234 is formed on a front surface of the TFT T.

After that, a pixel electrode 230 is formed so that it may be electrically connected with the drain electrode and substantially parallel to the data lines 224.

A pixel contact hole 229 that passes through the passivation layer 234 on the drain electrode 228 is formed so that a predetermined region of the drain electrode 228 may be exposed. The drain electrode 228 is electrically connected with the pixel electrode 230 through the pixel contact hole 229.

Further, the gate pad's contact hole 255 that passes through the gate insulation layer 218 and the passivation layer 234 on the gate pad 252 is formed so that a predetermined region of the gate pad 252 may be exposed. The gate line contact holes 256a and 256b that pass through the gate insulation layer 218 and the passivation layer 234 on the gate pad 252 and the gate lines 212 are formed so that predetermined regions of the gate pad 252 in the vicinity of the common-voltage supply line 259 and the gate lines 212 may be exposed, respectively.

The pixel electrode 230 includes: a plurality of vertical parts 230b that extend from the drain electrode 228, formed substantially parallel to the data lines 224, and spaced a predetermined interval from each other; and a horizontal part 230a formed on an upper portion of the common lines 216 to incorporate the vertical parts 230b into one part.

The horizontal part 230a of the pixel electrode 230 forms a storage capacitor C along with the common lines 216.

The gate pad's upper electrode 253 connected with the gate pad 252 through the gate pad's contact hole 255 is formed on the gate pad 252. Further, a jumping electrode 265 for connecting the gate pad 252 with the gate lines 212 is formed over the common-voltage supply line 259. Therefore, the jumping electrode 265 connects the gate pad 252 with the gate lines 212 through the gate line contact holes 256a and 256b.

An alignment film (not shown) is formed on a front surface of the substrate 210 formed as described above.

As described above, according to the present invention, the common-voltage supply line 259 and the common lines 216 are made of the same material so that a delay of the common signals can be prevented, and thus the image quality can be improved.

Figure 8:
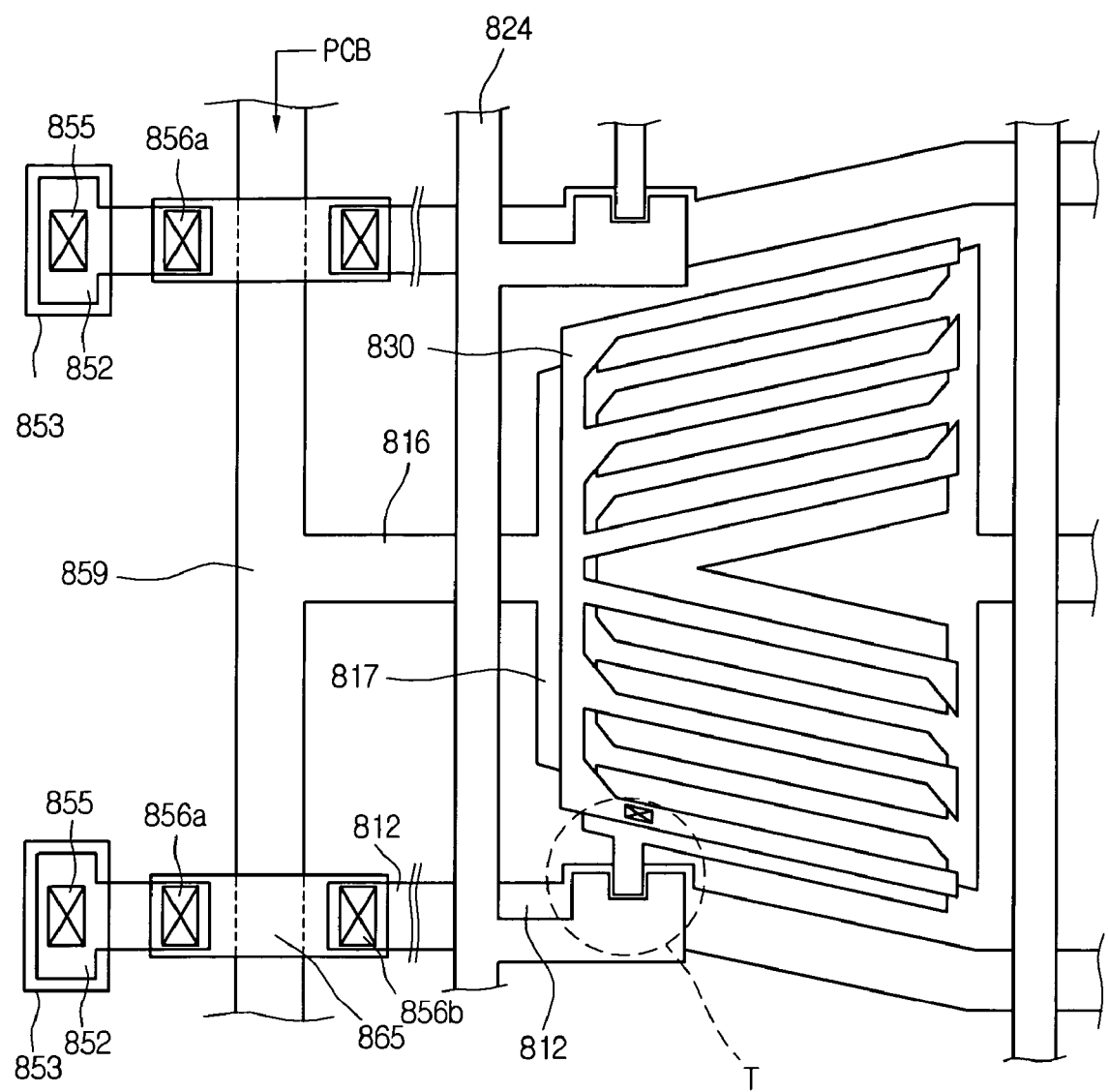
FIG. 8 is a plan view of an IPS mode LCD according to another embodiment of the present invention.

FIG. 8 is a plan view of an IPS mode LCD according to another embodiment of the present invention in which common electrodes are arranged in a direction parallel to the common lines. In FIG. 8, the IPS mode LCD includes: a plurality of gate lines 812 horizontally arranged substantially parallel with each other and spaced a predetermined interval on a substrate; a plurality of common lines 816 horizontally arranged substantially parallel with each other, and closely to the gate lines 812; and a plurality of data lines 824 crossing with the gate line 812 and common lines 816. vertically arranged substantially parallel with each other and spaced a predetermined interval, to define a pixel region P together with the gate lines 812.

A plurality of common electrodes 817 extend to the pixel region P and are connected with the common lines 816. The plurality of common electrodes may extend in a direction substantially parallel to a direction of the common lines 816.

A gate pad 852 is formed at one end of the gate lines 812 and a data pad is formed at one end of the data lines 824.

The common lines 816 are formed in a horizontal direction substantially parallel with the gate lines 812. The common lines 816 are integrally formed with a common-voltage supply line 859 provided at an outer block of a panel.

The common-voltage supply line 859 is formed in a direction substantially perpendicular to the common lines 816 to connect the common lines 816 of the respective pixel regions.

Because the common-voltage supply line 859 and the gate lines 812 are formed in a crossing direction, the gate lines 812 are spaced a predetermined interval from the common-voltage supply line 859 to prevent contact between the two. Specifically, the common-voltage supply line 859 is extended from the common lines 816 and formed in a direction substantially perpendicular to the common lines 816. The gate lines 812 are cut at portion crossing with the common-voltage supply line 859 and connected with the gate pad 852 through a jumping electrode 865.

A thin film transistor (TFT) T that includes a gate electrode, semiconductor layers, a source electrode and a drain electrode is formed at a crossing between the gate lines 812 and the data lines 824. A gate insulation layer is formed on the gate electrode which protrudes from the gate lines 812 and semiconductor layers including an active layer and ohmic contact layer are formed on the gate insulating layer.

The data lines 824 are formed on the gate insulation layer so as to form a matrix structure with the gate lines 812. Further, the source electrode extends from the data lines 824 and a drain electrode, spaced a predetermined interval from the source electrode, is formed on the gate insulation layer.

A passivation layer is formed on the source and drain electrodes. A pixel electrode 830 connected through the drain electrode and a drain contact hole is formed on the pixel region P with the passivation layer interposed therebetween.

The common lines 816 and the common electrode 817 are made of the same material and formed on the same layer as the gate lines 812. The material may include pure aluminum, pure copper, an aluminum alloy or a copper alloy. Therefore, since the common-voltage supply line 859 and the common lines 816 are made of the same material as the gate lines 812, common signals of the common-voltage supply line 859 are not hindered by any resistance and a signal delay does not occur. Accordingly, the common signals are supplied to the panel at a desired time and image quality of the panel is improved.

The gate pad 852 contacts a gate pad upper electrode 853 made of a transparent conductive electrode through a gate pad contact hole 855 that passes through the gate insulation layer and the passivation layer. The gate pad is connected with the gate lines 812 through the jumping electrode 865 made of a transparent conductive electrode and the gate line contact holes 856a and 856b. The jumping electrode 865 crosses the common-voltage supply line 859 and connects the gate line 812 and the gate pad 852.

Figure 9:
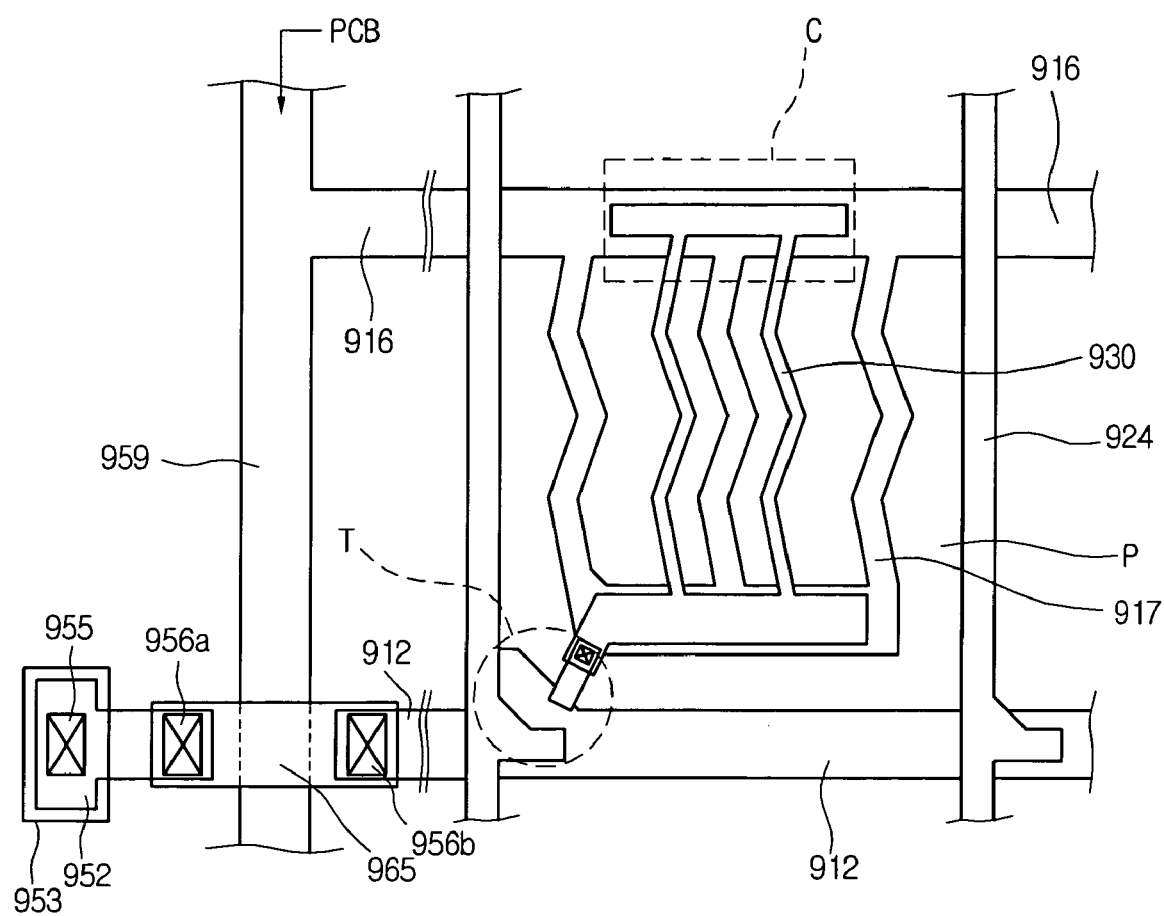
FIG. 9 is a plan view of an IPS mode LCD according to another embodiment of the present invention.

FIG. 9 is a plan view of an IPS mode LCD according to another embodiment of the present invention in which common electrodes are arranged in a zigzag pattern. In FIG. 9, the IPS mode LCD includes: a plurality of gate lines 912 horizontally arranged substantially parallel with each other and spaced a predetermined interval on a substrate; a plurality of common lines 916 horizontally arranged substantially parallel with each other, and close to the gate lines 912; and a plurality of data lines 924 crossing with the gate line 912 and common lines 916 vertically arranged substantially parallel with each other and spaced a predetermined interval to define a pixel region P together with the gate lines 912.

A plurality of common electrodes 917 extend to the pixel region P and are connected with the common lines 916. The plurality of common electrodes may extend from the common lines 916 in a substantially zigzag pattern.

A gate pad 952 is formed at one end of the gate lines 912 and a data pad may be formed at one end of the data lines 924.

The common lines 916 are formed in a horizontal direction substantially parallel with the gate lines 912. The common lines 916 are integrally formed with a common-voltage supply line 959 provided at an outer block of a panel.

The common-voltage supply line 959 is formed in a direction substantially perpendicular to the common lines 916 to connect the common lines 916 of the respective pixel regions.

Because the common-voltage supply line 959 and the gate lines 912 are formed in a crossing direction, the gate lines 912 are spaced a predetermined interval from the common-voltage supply line 959 to prevent contact between the two. Specifically, the common-voltage supply line 959 is extended from the common lines 916 and formed in a direction substantially perpendicular to the common lines 916. The gate lines 912 are cut at portion crossing with the common-voltage supply line 959 and connected with the gate pad 952 through a jumping electrode 965.

A thin film transistor (TFT) T that includes a gate electrode, semiconductor layers, a source electrode and a drain electrode is formed at a crossing between the gate lines 912 and the data lines 924. A gate insulation layer is formed on the gate electrode which protrudes from the gate lines 912 and semiconductor layers including an active layer and ohmic contact layer are formed on the gate insulating layer.

The data lines 924 are formed on the gate insulation layer so as to form a matrix structure with the gate lines 912. Further, the source electrode extends from the data lines 924 and a drain electrode, spaced a predetermined interval from the source electrode, is formed on the gate insulation layer.

A passivation layer is formed on the source and drain electrodes. A pixel electrode 930 connected through the drain electrode and a drain contact hole is formed on the pixel region P with the passivation layer interposed therebetween.

The common lines 916 and the common electrode 917 are made of the same material and formed on the same layer as the gate lines 912. The material may include pure aluminum, pure copper, an aluminum alloy or a copper alloy. Therefore, since the common-voltage supply line 959 and the common lines 916 are made of the same material as the gate lines 912, common signals of the common-voltage supply line 959 are not hindered by any resistance and a signal delay does not occur. Accordingly, the common signals are supplied to the panel at a desired time and image quality of the panel is improved.

The gate pad 952 contacts a gate pad upper electrode 953 made of a transparent conductive electrode through a gate pad contact hole 955 that passes through the gate insulation layer and the passivation layer. The gate pad is connected with the gate lines 912 through the jumping electrode 965 made of a transparent conductive electrode and the gate line contact holes 956a and 956b. The jumping electrode 965 crosses the common-voltage supply line 959 and connects the gate line 912 and the gate pad 952.

The manufacturing process of the IPS mode LCDs of FIGS. 8 and 9 are similar to those described in FIGS. 5 to 7.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. An in-plane switching (IPS) mode liquid crystal display device (LCD) comprising:
    a plurality of gate lines formed in a first direction on a substrate;
    a plurality of gate pads spaced a predetermined interval from one end of the gate lines by the common-voltage supply line;
    a plurality of common lines formed substantially parallel to the gate lines in the first direction;
    a common-voltage supply line integrally formed with the common lines;
    a plurality of data lines formed in a second direction that perpendicularly crosses the first direction of the gate lines;
    a thin film transistor (TFT) formed at a crossing of the gate lines and the data lines;
    a plurality of common electrodes extended from and integrally formed with the common lines; and
    a plurality of pixel electrodes arranged in an alternating pattern with the common electrodes,
    wherein the gate pads and the gate lines are cut at portions crossing the common-voltage supply line, and
    wherein the gate lines are connected with the gate pads through a jumping electrode at the cut portions.

2. The LCD according to claim 1, wherein the jumping electrode is made of a same material as the pixel electrodes.

3. The LCD according to claim 1, wherein the jumping electrode is formed on a same layer as the pixel electrodes.

4. The LCD according to claim 1, wherein the jumping electrode has the common-voltage supply line formed in a crossing manner with a passivation layer interposed at its lower portion.

5. The LCD according to claim 1, wherein the common electrodes, the common-voltage supply line and the common lines are made of a same material as the gate lines.

6. The LCD according to claim 5, wherein the material includes one of an aluminum alloy and a copper alloy.

7. The LCD according to claim 5, wherein the material includes one of pure aluminum and pure copper.

8. The LCD according to claim 1, wherein common electrodes, the common-voltage supply line and the common lines are formed on a same layer as the gate lines.

9. The LCD according to claim 1, wherein common signals supplied to the common-voltage supply line are applied to the common lines without a signal delay.

10. A method for manufacturing an in-plane switching (IPS) mode liquid crystal display device (LCD), the method comprising:
    forming a plurality of gate lines having a first direction, a plurality of common lines substantially parallel to the gate lines, a plurality of common electrodes extending from and integrally connected to the common lines, a plurality of gate pads spaced a predetermined interval from one end of the gate lines by the common-voltage supply line, and a common-voltage supply line having the first direction and integrally connected at one end of the common lines;

forming a plurality of data lines in a second direction so as to cross the gate lines;

forming source and drain electrodes, wherein the source electrodes are extended from the data lines; and forming a pixel electrode connected with the drain electrode and a jumping electrode, wherein the gate pads and the gate lines are cut at portions crossing the common-voltage supply line, and wherein the gate lines are connected with the gate pads through a jumping electrode at the cut portions.

11. The method according to claim 10, wherein the common electrodes extend in a direction substantially perpendicular to the first direction of the common lines on the substrate.

12. The method according to claim 10, wherein the common electrodes extend in a direction substantially parallel to the first direction of the common lines on the substrate.

13. The method according to claim 10, wherein the common electrodes extend in a substantially perpendicular direction from the first direction of the common lines in a zigzag pattern.

14. The method according to claim 10, wherein the predetermined interval is at least a width of the common-voltage supply line.

15. The method according to claim 10, wherein the common-voltage supply line and the common lines are made of a same material as the gate lines.

16. The method according to claim 15, wherein the material includes one of an aluminum alloy and a copper alloy.

17. The method according to claim 15, wherein the material includes one of pure aluminum and pure copper.

18. The method according to claim 10, wherein the common electrodes, the common-voltage supply line and the common lines are formed on a same layer as the gate lines.

19. The method according to claim 10, wherein the jumping electrode is made of a same material as the pixel electrode.

20. The method according to claim 10, where the jumping electrode is formed on a same layer as the pixel electrode.

21. The method according to claim 10, wherein the jumping electrode has the common-voltage supply line formed in a crossing manner with a passivation layer interposed at its lower portion.

22. The method according to claim 10, further comprising, before forming the source and drain electrodes:

forming a gate insulation layer on the gate electrode extending from the gate lines; and forming semiconductor layers that include an active layer and an ohmic contact layer over the gate electrode.

23. The method according to claim 10, further comprising supplying common signals to the common-voltage line, wherein the common signals supplied to the common-voltage supply line are applied to the common lines without a delay.

24. An in-plane switching (IPS) mode liquid crystal display device (LCD) comprising:

a first metal layer including a plurality of gate lines, a plurality of common lines, a plurality of common electrodes, a plurality of gate pads, and a common-voltage supply line integrally formed with the common lines;

a second metal layer including a plurality of data lines, and source and drain electrodes; and a third metal layer including a plurality of pixel electrodes and a jumping electrode, wherein the gate pads and the gate lines are cut at portions crossing the common-voltage supply line, and wherein the gate lines are connected with the gate pads through a jumping electrode at the cut portions.

25. A method of manufacturing an in-plane switching (IPS) mode liquid crystal display device (LCD) comprising:

forming a first metal layer including a plurality of gate lines, a plurality of common lines, a plurality of common electrodes, a plurality of gate pads, and a common-voltage supply line integrally formed with the common lines;

forming a second metal layer including a plurality of data lines, and source and drain electrodes; and forming a third metal layer including a plurality of pixel electrodes and a jumping electrode, wherein the gate pads and the gate lines are cut at portions crossing the common-voltage supply line, and wherein the gate lines are connected with the gate pads through a jumping electrode at the cut portions.

\* \* \* \* \*